3,365,189
CUSHIONING DEVICES
Robert L. Carlson, Chicago, Ill., assignor to W. H. Miner Inc., Chicago, Ill., a corporation of Delaware
Filed Feb. 3, 1966, Ser. No. 524,758
10 Claims. (Cl. 267—1)

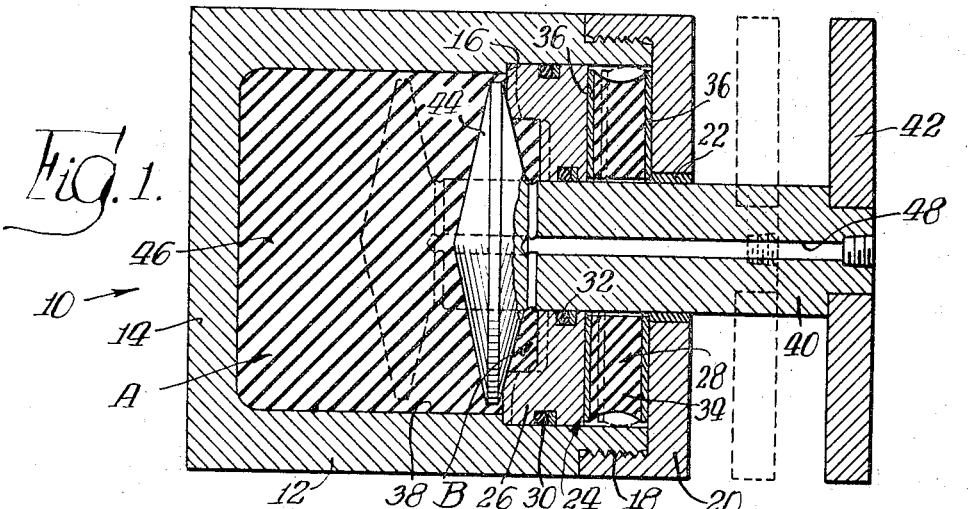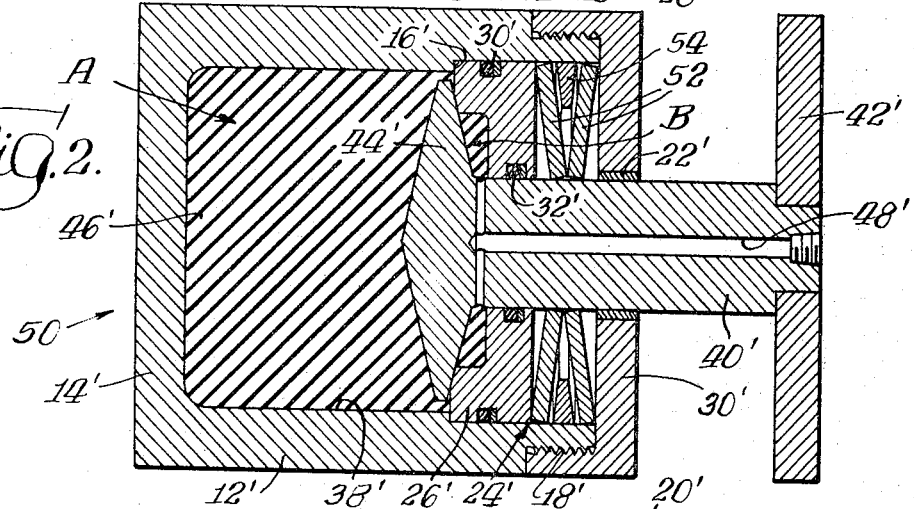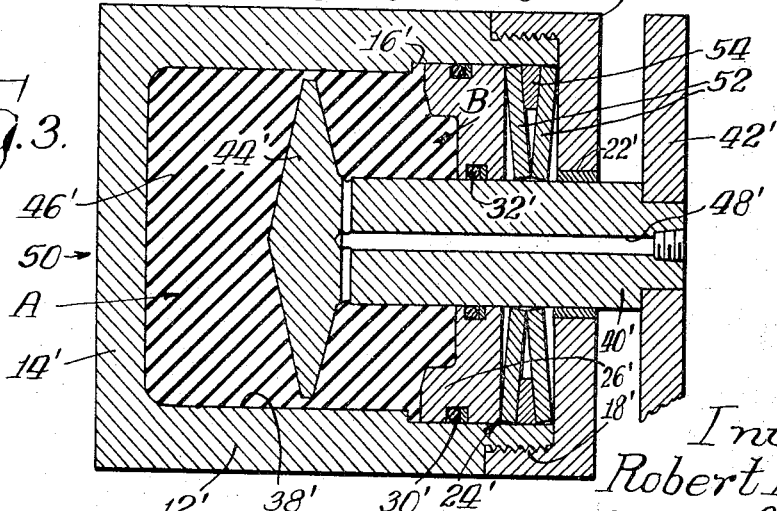

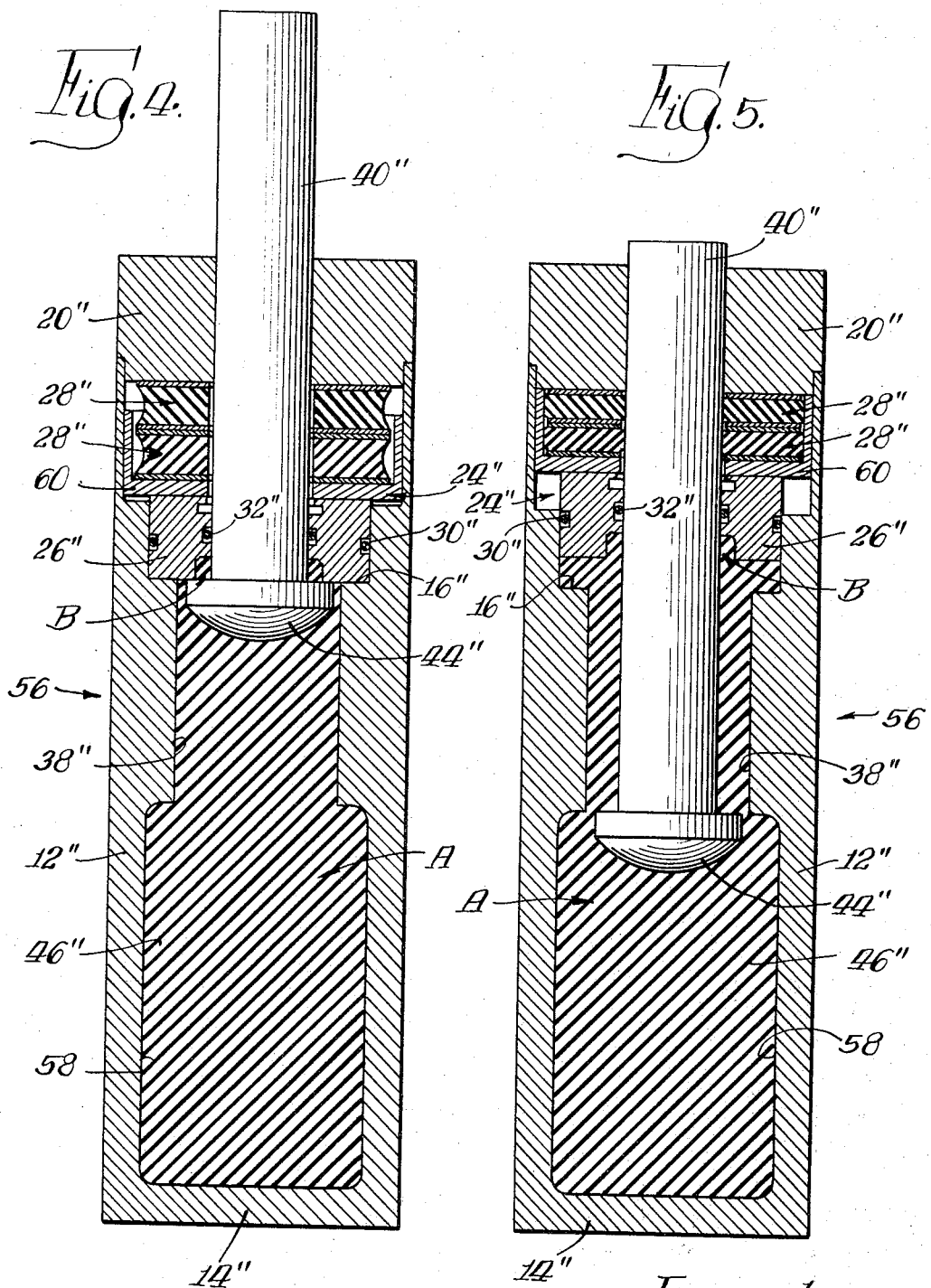

My present invention relates generally to cushioning devices and more particularly to modified damped spring means.

A damped spring, in general, comprises a casing with a chamber therein, a piston rod extending outwardly of the chamber for receiving buff forces, and a piston head at the end of the piston rod within the chamber. The piston head provides axial orifice means, and the chamber is filled with a compressible solid. As the piston rod moves into the chamber in response to buff forces, the reduction in volume of the compressible solid, and the throttling effect produced by the compressible solid being forced through the axial orifice means, impose a damping and spring force on the piston rod and piston head.

It is an object of my present invention to provide a damped spring unit having modified damping and spring characteristics. To accomplish this object, an auxiliary spring assembly, comprised of a piston member and spring means, is located in the casing at one end of the chamber. As the piston rod is moved into the chamber in response to buff forces and the compressible solid is forced through the orifice means, the energy of the buff forces is dissipated as a result of both compression of the spring assembly and reduction in volume of the compressible solid.

It is another object of my present invention to provide a damped spring unit, as described, which affords a differential spring rate when buff forces are applied to the piston rod. In this connection, the components of the modified damped spring unit are so arranged that the auxiliary spring assembly is first compressed and then the volume of the compressible solid is reduced when the unit is actuated in buff. By reason of this arrangement, the modified damped spring unit affords initially a relatively soft spring rate and subsequently a relatively stiff spring rate.

It is a further object of my present invention to provide a modified damped spring unit, as described, which is operative in draft. In this respect, the auxiliary spring assembly is located at the forward end of the chamber, and the energy of draft forces imposed on the piston rod is dissipated as the piston engages the piston member and causes the latter to compress the spring means.

Now in order to acquaint those skilled in the art with the manner of constructing and using cushioning devices in accordance with the principles of my present invention, I shall describe in connection with the accompanying drawings, preferred embodiments of my invention.

In the drawings:

FIGURE 1 is a lengthwise median sectional view of one embodiment of cushioning device of my present invention, with one operative position of the movable components being shown in solid lines, and with another operative position of the movable components being shown in dotted lines;

FIGURE 2 is a lengthwise median sectional view of a second embodiment of cushioning device of my present invention, with the movable components being shown in one operative position;

FIGURE 3 is a lengthwise median sectional view of the cushioning device of FIGURE 2, with the movable components being shown in another operative position;

FIGURE 4 is a lengthwise median sectional view of a third embodiment of cushioning device of my present invention, with the movable components being shown in one operative position; and FIGURE 5 is a lengthwise median sectional view of the cushioning device of FIGURE 4, with the movable components being shown in another operative position.

Referring now to FIGURE 1, there is shown one embodiment of modified damped spring unit of my present invention identified generally by the reference numeral 10. The modified damped spring unit or cushioning device 10 comprises a casing 12 having a closed end wall 14 and a hollow cylindrical interior of stepped diameter whereby an annular shoulder 16 is defined. The open or forward end of the casing is provided with external threads 18 on which an annular end or cap member 20 is threadingly secured. The cap member 20 carries a central bushing member 22. The casing 12 and cap member 20 serve as casing means.

Arranged within the casing 12, adjacent the forward end thereof, is an auxiliary spring assembly 24 comprised of an annular, axially slidable, floating piston member 26 and annular spring means in the form of a resilient pad unit 28. Mounted within the piston member 26 are an outer seal ring 30 that engages the adjacent inner periphery of the casing 12 and an inner seal ring 32. The resilient pad unit 28, which includes an elastomer pad 34 interposed between and bonded to a pair of metal discs 36, is disposed intermediate the cap member 20 and the piston member 26. The pad unit 28 biases the piston member 26 axially inwardly of the casing 12, while the shoulder 16 limits inward movement of the piston member. In addition, the piston member 26 defines with the interior of the casing 12 a chamber 38.

Extending through the cap member 20, the resilient pad unit 28, and the piston member 26, and into the chamber 38 is a piston rod 40. The bushing member 22 slidably guides the piston rod 40 in the cap member 20, while the seal ring 32 provides a seal about the piston rod. The outer end of the piston rod 40 is preferably provided with a follower plate 42 which is adapted to receive buff and draft forces. The inner end of the piston rod 40 is provided with a piston head 44 that divides the chamber 38 into a first section A and a second section B. The periphery of the piston 44 is spaced from the interior cylindrical surface of the chamber 38 to define axial orifice means in the form of an annular orifice. In addition, the chamber 38 is filled with a compressible solid or elastomer 46 such as silicone rubber. The cap member 20 adjustably maintains the resilient pad unit 28 under initial compression, and the latter in turn serves to preload the compressible solid 45. Finally, passageway means 48 is provided in the piston rod 40 in order that air may be bled from the chamber 38 to the atmosphere, for example, during filling or preloading. When the cushioning device 10 is inactive or at rest, the movable components thereof assume the position shown in solid lines in FIGURE 1.

In the operation of the cushioning device 10, buff forces imposed on the follower plate 42 cause the piston rod 40 and piston 44 to move inwardly of the casing 12. During such movement, the piston 44 is forced into the compressible solid 46 in the chamber section A whereupon the compressible solid is caused to flow through the annular orifice surrounding the piston 44 from the chamber section A to the chamber section B. Initially, the compressible solid displaced by the piston rod causes the piston member 26 to move axially outwardly to the dotted line position thereby compressing the resilient pad unit 28. As a result, a portion of the energy of the buff forces is dissipated by the resilient pad unit 28. After the pad 28 has been fully compressed, further inward movement of the piston rod 40 reduces the volume of the compressible solid thus increasing the pressure therein. Also, as the compressible solid 46 is metered through the annular orifice surrounding the piston head 44, a throttling effect is produced causing a pressure build-up in the compressible solid in chamber section A and a corresponding resistance to the buff forces. The described throttling effect and volume-pressure change of the compressible solid serve to dissipate the energy of buff forces that remains unabsorbed by the resilient pad unit 28.

When the buff forces are fully dissipated, or removed from the follower plate 42, the pressure of the compressible solid 46, acting on the unbalanced area of the piston rod 40, causes the piston 44 and piston rod 40 to return to the solid line position shown in FIGURE 1. During the return stroke of the piston rod 40 the compressible solid flows back through the annular orifice surrounding the piston head 44 to fill the space being vacated by the piston head. At the same time, the resilient pad unit 28 is permitted to expand and thereby returns the piston member 26 to the solid line position abutting the shoulder 16. In accordance with the foregoing operation, the resilient pad unit 28 provides a relatively soft damping and spring force, while the compressible solid 46 provides a relatively stiff damping and spring force, as the piston rod moves into the chamber 38. Consequently, the cushioning device or modified damped spring unit 10, when actuated in buff, affords initially a relatively soft spring rate and subsequently a relatively stiff spring rate with high load capacity.

The cushioning device 10 also operates in draft. In this circumstance, draft forces imposed on the follower plate 42 cause the piston rod 40 and piston 44 to move in a direction outwardly of the casing 12. The piston 44 thus engages the piston member 26 and causes the latter to compress the resilient pad unit 28, whereby the energy of draft forces is dissipated.

A second embodiment of cushioning device 50 is shown in FIGURES 2 and 3. Primed reference numerals have been used to indicate components that are the same or similar to components identified in FIGURE 1. In the cushioning device 50, the spring means disposed intermediate of the cap member 20' and the piston member 26' comprises a pair of Belleville or conical disc springs 52 with a spacer ring 54 therebetween. The springs 52 serve the same purpose as the resilient pad unit 28 of FIGURE 1, and are adapted to be compressed until they are fully engaged with the spacer ring 54. The cushioning device 50 functions in the same manner as the device 10 in both buff and draft, and offers the same features and advantages as the device 10. In FIGURE 2 the cushioning device 50 is shown inactive, while in FIGURE 3 the device 50 is shown under the influence of buff forces.

A third embodiment of cushioning device 56 is shown in FIGURES 4 and 5. Double-primed reference numerals have been used to indicate components that are the same or similar to the components identified in FIGURE 1. In the cushioning device 56, the casing 12" is provided with an end cavity 58 that serves as an extension of the chamber 38". Also, the spring means interposed between the cap member 20" and the piston member 26" comprises a pair of resilient pad units 28" and a cup shaped annular spring carrier 60. The pad units 28" are compressible when either buff or draft forces are imposed on the piston rod 40". During the application of forces, the spring carrier 60 moves with the piston member 26" and is engageable with the cap member 20" for limiting compression of the pad units 28". As will be appreciated, the cavity 58 may be circular or square in cross section, and the outer periphery of the pad units 28" may be circular or square. In FIGURE 4 the cushioning device 56 is shown at rest, while in FIGURE 5 the device 56 is shown in an operative position under the application of buff forces. The cushioning device 56 functions in the same manner as the device 10 in both buff and draft, and offers the same features and advantages as the device 10. In addition, the compressible solid 46" is precompressed approximately 3% and the corresponding internal pressure is about 5,000 p.s.i. At full closure, the compressible solid is compressed an additional 8-12% and the corresponding internal pressure is then about 35,000 p.s.i. In these circumstances, less compressible solid is required in the device 56 than in an unmodified damped spring of comparable capacity, because the reduction in volume of the compressible solid caused by piston rod displacement is limited as indicated.

If it should be desired to have a cushioning device which has generally the same initial soft spring rate of the devices described thus far herein but a faster acting stiff spring rate, the chambers 38, 38' or 38" may be filled with a conventional hydraulic fluid rather than a compressible solid. It would, however, be necessary to provide more sophisticated sealing means of conventional types well known in the hydraulic art.

While I have shown and described what I believe to be preferred embodiments of my present invention, it will be understood by those skilled in the art that various rearrangements and modifications may be made therein without departing from the spirit and scope of my invention.

I claim:

1. A cushioning device comprising casing means with a chamber therein, a spring assembly at one end of said chamber, a piston rod extending inwardly of said chamber and said casing means, a piston head at the end of said piston rod within said chamber and providing axial orifice means, a compressible solid filling said chamber, said piston rod being movable into said chamber in response to buff forces whereupon said compressible solid is forced through said orifice means, and the energy of such buff forces being dissipated as a result of compression of said spring assembly and reduction in volume of said compressible solid.

2. The cushioning device of claim 1 wherein said spring assembly comprises a piston member defining one end of said chamber, and spring means intermediate said piston member and said casing means.

3. The cushioning device of claim 2 wherein said spring means is comprised of at least one resilient pad unit.

4. The cushioning device of claim 2 wherein said spring means is comprised of at least one conical disc spring.

5. A cushioning device comprising a casing with an open end and a closed end, an end member secured to said open end of said casing, a piston member axially slidable in said casing, spring means intermediate said end member and said piston member, said piston member defining with said casing a chamber, a piston rod extending through said end member and said spring means and said piston member into said chamber, a piston head at the end of said piston rod within said chamber and providing axial orifice means, a compressible solid filling said chamber, said piston rod being movable into said chamber in response to buff forces whereupon said compressible solid is forced through said orifice means, and the energy of such buff forces being dissipated initially as a result of the displaced compressible solid causing said piston member to compress said spring means and subsequently as a result of reduction in volume of the compressible solid.

6. The cushioning device of claim 5 wherein said axial orifice means is an annular orifice defined between the interior of said chamber and the periphery of said piston head.

7. The cushioning device of claim 5 wherein said spring means is comprised of at least one resilient pad unit.

8. The cushioning device of claim 5 wherein said spring means is comprised of at least one conical disc spring.

9. The cushioning device of claim 5 including a spring carrier movable with said piston member and engageable with said cap member for limiting compression of said spring means.

10. The cushioning device of claim 5 wherein the energy of draft forces imposed on said piston rod is dissipated as said piston head engages said piston member and causes the latter to compress said spring means.

References Cited

UNITED STATES PATENTS 2,984,478   5/1961   Westcott _____ 267—64

ARTHUR L. LA POINT, *Primary Examiner.*

R. M. WOHLFARTH, *Assistant Examiner.*